ANGULAR MODULATION DETECTION SYSTEM

Filed Jan. 9, 1958 3 Sheets-Sheet 1

INVENTOR:
ROBERT B. DOME,
BY Joseph Levinson
HIS ATTORNEY.

Sept. 27, 1960 R. B. DOME 2,954,464

ANGULAR MODULATION DETECTION SYSTEM

Filed Jan. 9, 1958 3 Sheets-Sheet 2

INVENTOR:
ROBERT B. DOME,

BY Joseph Levinson

HIS ATTORNEY.

Sept. 27, 1960 R. B. DOME 2,954,464

ANGULAR MODULATION DETECTION SYSTEM

Filed Jan. 9, 1958 3 Sheets-Sheet 3

INVENTOR:
ROBERT B. DOME,
BY Joseph Levinson
HIS ATTORNEY.

United States Patent Office 2,954,464

Patented Sept. 27, 1960

2,954,464

ANGULAR MODULATION DETECTION SYSTEM

Robert B. Dome, Geddes Township, Onondaga County, N.Y., assignor to General Electric Company, a corporation of New York

Filed Jan. 9, 1958, Ser. No. 708,017

16 Claims. (Cl. 250—20)

Figure 1:
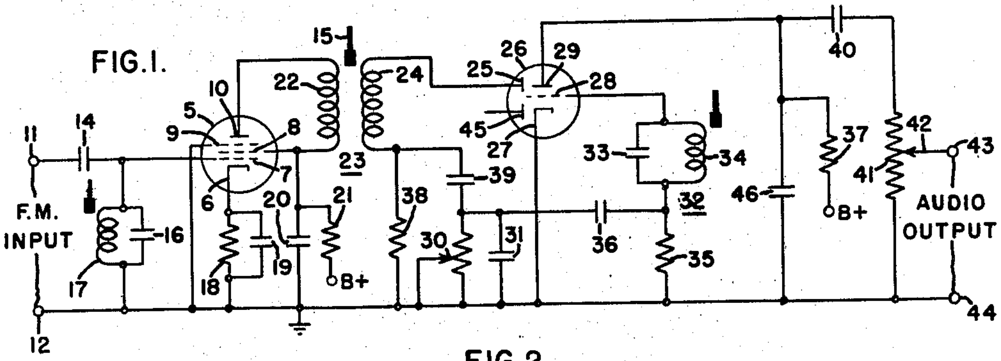

This invention relates to a detection system for recovering the intelligence signal conveyed by an angularly modulated carrier wave and more particularly to a frequency modulation detection system particularly suitable for use in the sound channel of a television receiver.

Although great care is exercised at the transmitter to insure that an angularly modulated carrier wave is not amplitude modulated, still by the time the signal is applied to a detector some undesired amplitude components appear due to noise, interference, and other distortion in transmission and reception even in well-designed circuits. Consequently, amplitude modulation rejection circuits, commonly known as A.M. rejection circuits, must be provided for eliminating these undesirable amplitude modulation components in order to avoid having distortion in the receiver output.

One method commonly employed for A.M. rejection consists of using a limiter prior to detection. As is well known to those skilled in the art, the limiter prevents voltages greater than a predetermined level from being applied to the detector. However, the voltage applied to the limiter must reach a predetermined value before the limiter functions for A.M. rejection. The smallest amplitude at which the limiter is effective is still much greater than the amplitude of many weak but useful signals. This would prevent useful signals contained in comparatively weak carrier waves from being recovered. Therefore, other means are needed to provide A.M. rejection for weak signals.

To overcome some of the aforesaid difficulties, ratio detectors have been used extensively because of their inherent A.M. rejection characteristics. However, their output is relatively low, requiring an additional audio frequency amplification stage between the detector and audio power output amplifier. Ratio detectors also contain expensive components such as a triple diode, high mu triode tube, an elaborate triple winding discriminator transformer, and an electrolytic capacitor.

Accordingly, it is an object of this invention to provide a novel detection system which has good A.M. rejection characteristics and sufficient output to drive an audio power output stage directly, yet is more economical than detection systems currently employed.

In one way of carrying out this invention amplitude compression means are provided for reducing the percentage of any amplitude modulation on the angularly modulated carrier wave and for producing a detected output wave corresponding to the envelope of the undesired amplitude modulation. A single ended discriminator-detector, i.e. a single ended frequency modulation detector, recovers the desired intelligence signal from the carrier wave as modified by the amplitude compression means. The detected output wave of the amplitude compression means is introduced into the discriminator-detector with such polarity as to reduce the fundamental component of the undesired amplitude modulation appearing in the intelligence signal.

These and other advantages of this invention will be more clearly understood from the following description taken in connection with the accompanying drawings, and its scope will be apparent from the appended claims.

Figure 2:
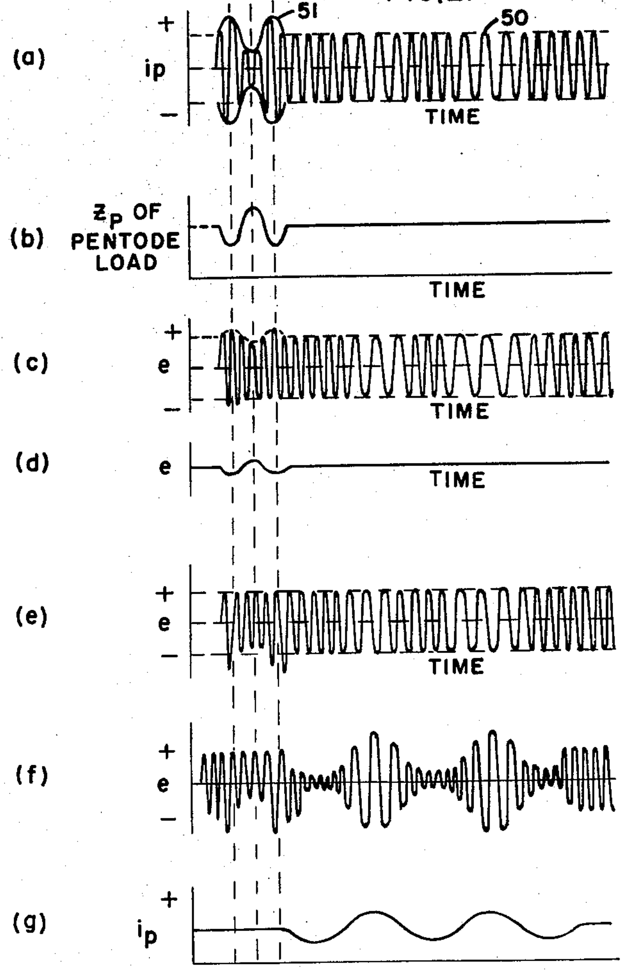
Figure 3:
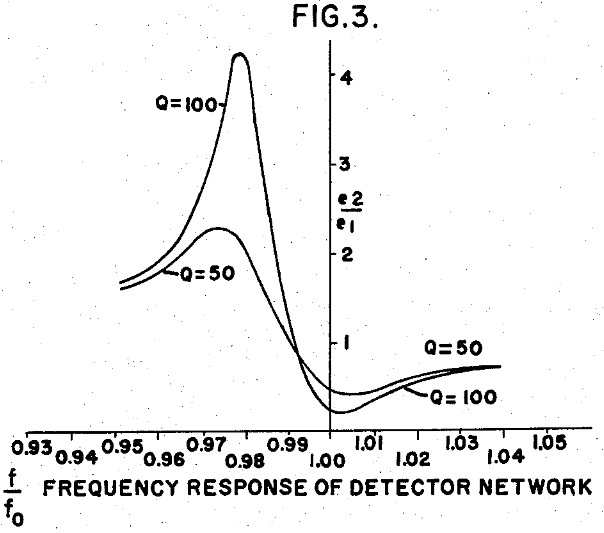
Figure 4:
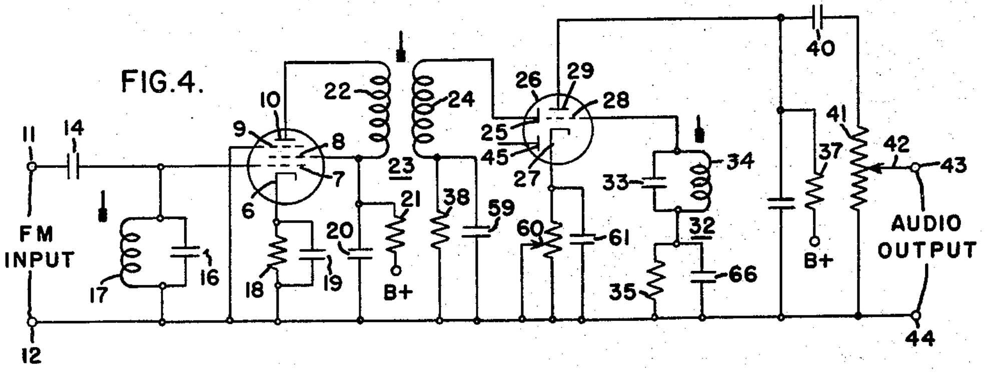
Figure 5:
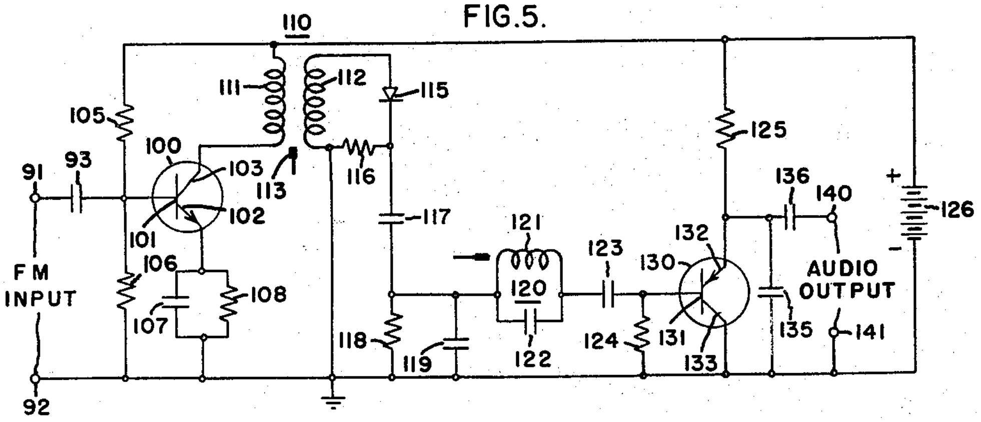
Figure 6:
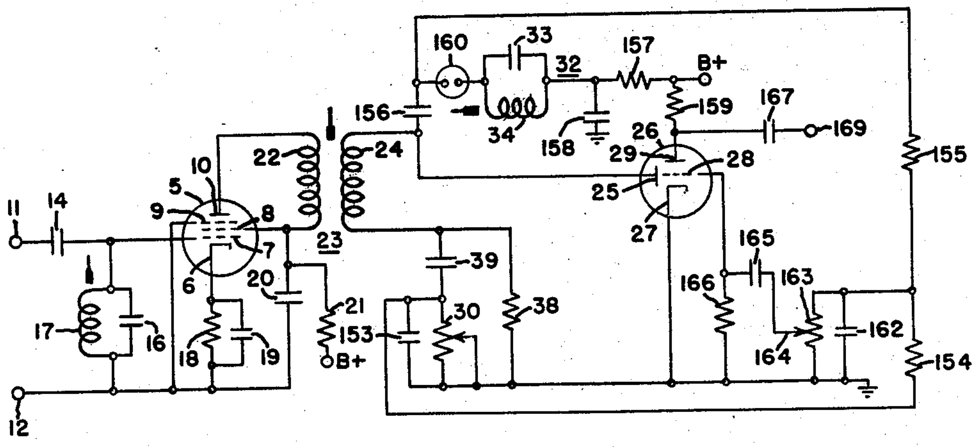
Figure 7:
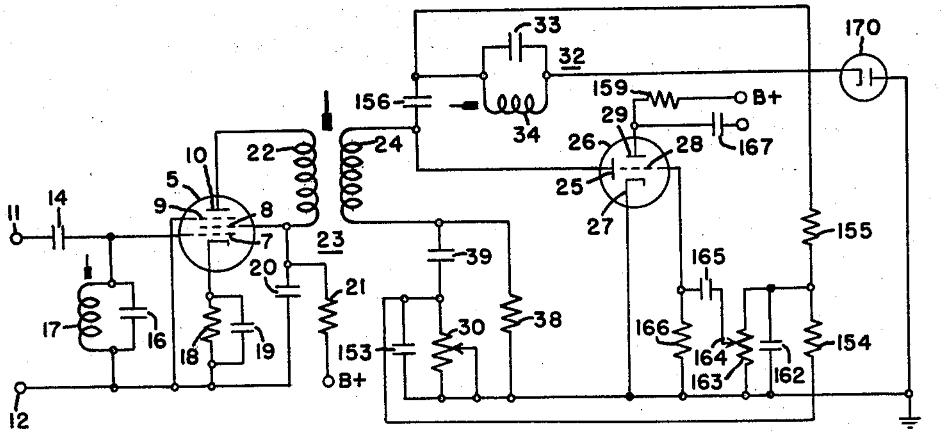

In the drawings,

Fig. 1 is a schematic diagram of one embodiment of the frequency modulation detection system of this invention, Figs. 2*a* through 2*g* represent a series of wave forms appearing at various points in the circuit of Fig. 1 which are used in explaining its operation, Fig. 3 shows a frequency response curve of the discriminator network employed in this invention, Fig. 4 is a schematic diagram of an alternative embodiment of the invention similar to Fig. 1, Fig. 5 is a schematic diagram of another embodiment of the invention Fig. 1 employing semiconductors instead of vacuum tubes, Fig. 6 is a schematic diagram of another embodiment of this invention, and Fig. 7 is a schematic diagram of an alternative embodiment of Fig. 6.

In order to simplify the explanation of the various embodiments of this invention, like elements have been assigned like reference characters. To further simplify the explanation a frequency modulated carrier is discussed as a preferred source although it is to be understood that other types of angular modulated waves might be used.

Referring now to Fig. 1, a frequency modulation carrier wave is applied to a pair of input terminals 11 and 12, the latter being at ground potential. A pentode amplifier 5 having a cathode 6, a control grid 7, a screen grid 8, a suppressor grid 9 and an anode 10 provide an amplitude limiter stage to act on the carrier wave. Whereas other kinds of amplifiers may be used as a limiter, it is essential, for reasons that will be subsequently explained, that the amplifier have a relatively high internal impedance for carrier frequencies in order to aid in producing the desired amplitude compression of the carrier wave. The carrier wave is applied to control-grid 7 of the pentode amplifier tube 5 by a coupling capacitor 14. A tuned circuit consisting of an inductor 17 and a capacitor 16 is connected between the control grid 7 and ground, and is resonant at the center carrier frequency of the applied F.M. carrier wave in order to maximize the voltage applied to control grid 7. In an intercarrier sound television receiver built in accordance with present standards, the center frequency is 4.5 megacycles. In this explanation 4.5 megacycles is used for purposes of illustration but other center carrier frequencies could be utilized. Cathode 6 of pentode 5 is connected to ground by a bias resistor 18 which is shunted by radio frequency bypass capacitor 19. The suppressor grid 9 of the pentode 5 is shown connected to ground, but it could also be connected to the cathode 6. The anode 10 of pentode amplifier tube 5 is connected to one end of the primary winding 22 of a transformer 23, the other end of the winding 22 being connected to the screen grid 8. A B+ potential is applied to the screen grid 8 through an isolation or filter resistor 21. Screen grid 8 is also bypassed to ground by a capacitor 20. The secondary winding 24 of transformer 23 is closely coupled to the primary winding 22, for example, by making use of a bifilar construction. The transformer 23 and its associated tube and stray circuit capacitance are tuned by a single magnetic core 15 to the center carrier frequency of 4.5 megacycles.

The structure which, in this particular embodiment, cooperates with the amplifier 5 to compress the carrier waves and to detect the amplitude modulations thereon is as follows. The upper end of the secondary winding 24 is connected to a diode anode 25 of a vacuum tube 26. In this particular arrangement, the vacuum tube 26, is a duo-diode high mu triode tube having a pair of diode anodes 25 and 45, a common cathode 27, or if desired the cathodes may be physically separated, a control grid 28, and a plate electrode 29. The lower terminal of the secondary winding 24 is connected to ground through a resistor 38. The resistor 38 is shunted by an audio frequency bypass capacitor 39 in series with a relatively low variable resistor 30 having one end thereof connected to ground. Variable resistor 30 is shunted by a capacitor 31. The cathode 27 is connected to ground. The resistor 38 and the capacitor 39 serve to bias the diode 25, 27 and the time constant of the capacitor 31 and the resistor 30 is such as to permit some detected amplitude variations and some compressed carrier waves to exist across them.

The discriminator-detector, i.e. the frequency modulation detector, and a circuit for reducing undesired amplitude modulation will now be described. The detected amplitude modulation components and the compressed carrier wave appearing across the resistor 30 and the capacitor 31 are coupled via an audio frequency capacitor 36 to one end of a tank circuit 32 that is resonant either above or below 4.5 megacycles and is comprised of a capacitor 33 and inductor 34 connected in shunt. The other end of tank circuit 32 is connected to control grid 28 of the triode section of tube 26. The lower end of tank circuit 32 is also connected to ground by a grid leak resistor 35. Triode anode 29 is connected to B+ through a resistor 37. Anode 29 is bypassed to ground by radio frequency bypass capacitor 46. Anode 29 is also coupled by capacitor 40 to a load circuit consisting of a volume control potentiometer 41 having an arm 42 connected to an output terminal 43 and having one end thereof grounded. Output terminal 44 is connected to ground.

Before considering the general operation of the circuit of Fig. 1, several parts of the system will be considered separately in order to more clearly set forth the functions performed and the operation of each part.

As has been previously stated, some form of amplitude modulation rejection must be provided to reduce undesirable amplitude modulation components which appear in the input signal applied to input terminals 11 and 12. To aid in this respect, pentode amplifier tube 5 is operated as an overdriven grid limiter for strong signals. This means that when the R.F. voltage applied between the grid 7 and ground increases to a sufficient magnitude, the pentode tube 5 acts as a limiter of amplitude modulation. As will appear obvious to those skilled in the art, the applied voltage must reach a predetermined value before the limiter functions for amplitude modulation rejection. Since useful signals appear which never reach this predetermined value, other means must be provided in order to obtain A.M. rejection. Stating the problem in another way, the voltage gain of the pentode amplifier 5 is such that a useful signal is available in the plate circuit for detection purposes when the grid voltage is only a small fraction of a volt which is well below its limiting level. Since ordinary overdriven grid limiting for amplitude rejection purposes is of no avail under these circumstances, some form of amplitude modulation reduction must be employed in the plate circuit of the pentode where the voltage is relatively great in order to provide amplitude rejection. In other words, some means must be provided for reducing the percentage of amplitude modulation in the plate circuit in order that weak signals may be used for detection. Since the R.F. voltage appearing across the load circuit of the pentode amplifier 5 is proportional to the load resistance, the effective percentage of undesired amplitude modulation components could be reduced or compressed if the load presented to the pentode amplifier could be operated upon in an inverse manner with respect to the amplitude variations of the R.F. carrier wave supplied to terminals 11 and 12. The diode compressor circuit consisting of a diode section of tube 26, resistance 38 and capacitor 39 forms such a variable load. By suitably choosing the value of resistance for resistor 38, the percentage of amplitude modulation that can be limited may be predetermined. If the magnitude of resistor 38 is increased, the level of A.M. that can be limited is reduced but the degree of reduction is increased. Conversely, if resistor 38 is decreased the level of A.M. that can be limited is increased but the degree of reduction is decreased. A suitable compromise should be made. The capacitor 39 which is connected across resistor 38 functions to hold the bias on the diode over the audio frequency range. In operation, if more voltage is induced into the secondary winding 24 and applied to plate 25 of the diode as in the case of a positive peak of amplitude modulation, the diode draws disproportionately more current thus providing a lower than average resistance to be reflected back to the plate circuit of pentode tube 5. Since the plate current of tube 5 is substantially constant with respect to the load impedance, the same current working through less reflected impedance tends to reduce the voltage that is developed across the secondary winding 24. Conversely, if less voltage is applied to plate 25 as in the case of a negative peak of amplitude modulation, the diode draws disproportionately less current thus providing a higher than average resistance to be reflected back to the pentode 5 plate circuit, so that the plate current working through the increased resistance tends to increase the voltage that is developed across secondary winding 24. Consequently, changes in amplitude appearing in the plate current of tube 5 caused by undesirable amplitude modulation on a frequency modulation carrier wave are acted on inversely by the diode compressor to reduce or compress the percentage of such amplitude modulation.

Reference is now made to Figs. 2*a* through 2*d* for a further explanation of the operation of the diode compressor circuit embodied in this invention. Fig. 2*a* shows the wave form of the grid voltage applied to the grid 7 of pentode tube 5 and also represents the plate current of plate 10. The wave 50 represents a frequency modulated carrier wave having undesirable amplitude modulation components 51 thereon. Fig. 2*b* represents a plot of the pentode load impedance ($Zp$) vs. time. This is the impedance presented to the pentode plate current with the diode compressor operating as described above. It should be noted that the impedance presented to the pentode plate current is the least for maximum excursions in plate current due to undesired amplitude modulation components 51. This combination of the plate current shown in Fig. 2*a* working through a load impedance shown in Fig. 2*b* provides an output voltage across the pentode tank circuit 23 which is the product of the pentode plate current and pentode plate load impedance. The wave form of this voltage illustrated in Fig. 2*c* shows the A.M. compression which takes place as the result of the operation of the diode compressor circuit. With the proper selection of circuit perameters, it has been found in actual tests that an originally 50% modulated wave can be reduced to about a 3% modulated wave by the use of the diode compressor of this invention thereby providing a compression ratio of around 16 to 1 or amplitude limiting of some 24 D.B.

Since the diode consisting of plate 25 and cathode 27 normally functions as a detector of amplitude modulated waves, as a by-product of the amplitude compression, the undesirable amplitude variations of wave 50 are detected. This voltage is shown in Fig. 2*d* as it appears across variable resistor 30 as a result of the detection of the wave shown in Fig. 2*c*. At the same time, a portion of the voltage appearing across the transformer 23 also appears across resistance 30. The R.F. voltage across resistor 30 and capacitor 31 is caused by the R.F. current circulating through these elements as part of the elements of the secondary circuit including the inductance of winding 24 and the capacitance between anode 25 and cathode 27 of the diode section of tube 26. In this respect, the capacitor 31 is so chosen in value that sufficient R.F. voltage is present across it and resistor 30 to properly excite the triode grid 28 through a network consisting of coupling capacitor 26, tank circuit 32, and the input capacity of the triode section of tube 26. As will be seen in Fig. 2*e*, the voltage which is supplied to the grid 28 of tube 26 consists of the total voltage across resistor 30 which includes the radio frequency component and is a summation of the waves shown in Figs. 2*c* and 2*d*. As will be seen from curve 2*d*, the detected voltage obtained as a result of the detection of the amplitude variations of the wave shown in Fig. 2*c* is of such phase and amplitude that when the two waves are combined such undesirable amplitude variations are substantially eliminated on the positive-going radio frequency half cycles. The cancellation adjustment may be attained by properly varying the magnitude of variable resistor 30. The adjustment of resistor 30 depends somewhat on the capacitance of capacitor 31, since it is their combined impedance which determines the R.F. input to the discriminator circuit. Capacitor 31 insures that the R.F. grid excitation to grid 28 is not so great as to overdrive the tube 26 and make A.M. balancing impossible. If the impedance and Q of tank circuit 32 could be properly selected or if the wiring and stray capacitance to ground is sufficient, capacitor 31 might be dispensed with.

The next portion of the system to be considered is the discriminator circuit. As will be obvious to those skilled in the art, for frequency modulation detection, a circuit must be provided that enables the frequency variations of the frequency modulated signal to appear as variations in amplitude of the signal applied to a detector for rectification. This may be accomplished by means of a tuned circuit because tuned circuits are resonant at one frequency, and the output across the tuned circuit varies in magnitude for different input signal frequencies. The discriminator circuit of the present invention is a relatively simple single-ended one, as it consists of a shunt tuned tank circuit 32 connected in series with the input capacitance of tube 26. As will appear obvious to those skilled in the art, the Q of this tuned circuit may be varied by shunting a resistance across it. The frequency response curves for this network for two different values of Q for the tank circuit are shown in Fig. 3. The ordinate axis represents the ratio of output to input voltage of the circuit, and the abscissa represents the ratio of frequency to the resonant frequency of tank 32. When the carrier frequency of the F.M. signal falls on the sloping side of this frequency response curve, the frequency variations of the carrier signal are converted to equivalent amplitude variations due to the unequal response above and below the center carrier frequency. Referring now to the curves on Fig. 3, if the desired frequency deviation is ±25 kilocycles or a total of 50 kilocycles about a carrier frequency of 4.5 megacycles, on the curve a 0.01 change in frequency represents a variation of 45 kilocycles. A 0.011 frequency change on the curves would be required for proper conversion of the 50 kilocycle frequency variation into corresponding amplitude variations. It will be seen from the curves of Fig. 3 that fairly good linearity may be obtained in the region between the values of 0.991 and 0.98 on either curve with the unmodulated carrier centered at a frequency of 0.9855. The output of this discriminator circuit which is applied to the triode section of tube 26 is shown on Fig. 2*f*. It can readily be seen that the frequency variations occurring in the carrier wave have been converted into amplitude variations, and are ready to be recovered by some form of detection.

A single and relatively inexpensive triode is operated as a power detector to provide high audio output levels for relatively low radio frequency input levels. The grid 28 and cathode 27 of the triode section of tube 26 rectifies the R.F. voltage applied to the grid 28 causing a bias to be developed as a result of grid current flow through grid leak resistor 35. This voltage is stabilized by the relatively large capacitor 36. The triode portion of tube 26 then acts as a bias or power type detector. The bias developed on grid leak resistor 35 biases the triode portion of tube 26 approximately to cut-off. Consequently, if a radio frequency signal voltage is applied to grid 28, pulses of plate current occur on positive half cycles of R.F., and no current appears in the plate circuit on negative half cycles of R.F. The resulting average plate current is dependent on the average amplitude of the applied signal. Fig. 2*f* shows the R.F. signal which is applied to the grid 28 and Fig. 2*g* shows the envelope of the resulting plate current. Resistor 37 which is connected to plate 29 has a relatively large magnitude in order to provide more efficient detection over a greater range of voltages applied to the grid 28. Deemphasis is provided in the plate circuit of the triode by the capacitor 46 shunted by resistors 37 and 41, and the internal plate resistance of tube 26.

Now that the various components which make up the system and their operation have been discussed individually, a brief description of the operation of the entire system is given. A 4.5 megacycle frequency modulated carrier wave applied to the input terminals 11 and 12 is maximized by the parallel resonant circuit consisting of inductance 17 and capacitor 16, and applied to grid 7 of pentode amplifier 5. The pentode tube 5 amplifies this signal, and when its voltage attains a certain sufficient magnitude, the tube acts as a limiter of amplitude modulation. The output of pentode 5 is acted upon by the diode compressor circuit so as to reduce the percentage of modulation of any amplitude modulation present. The diode compressor circuit accomplishes this reduction or compression of amplitude modulation by inversely acting upon the impedance presented to the pentode plate current with respect to the direction (up or down) and amount of amplitude modulation. The resultant R.F. wave shown in Fig. 2*c* is applied to the grid 28 of tube 26. This is accomplished by properly selecting the value of capacitor 31 and hence the impedance of the shunt circuit formed by resistor 30 and capacitor 31, so that the function of the R.F. current which exists in the tuned circuit 23 multiplied by the shunt circuit impedance develops the desired resultant wave. This voltage is coupled from capacitor 31 via a coupling capacitor 36 and the tank circuit 32 to grid 28. Tank circuit 32 in conjunction with the input capacitance between grid 28 and cathode 27 form a frequency selective or discriminator network. This network functions to vary the amplitude applied to the grid 28 in accordance with frequency variations in the frequency modulated carrier wave. The grid cathode region of tube 26 rectifies the R.F. voltage thereby causing a bias to be developed across grid-leak resistor 35. This voltage is stabilized by capacitor 36 to bias the tube near cut-off. The triode then acts as a bias or power detector to detect radio frequency envelopes occurring at an audio frequency rate. Any residual amplitude modulation not removed by the diode compressor would also tend to be detected by the triode portion of tube 26. For example, if a positive-going amplitude modulation cycle is applied, the plate current of the triode would tend to increase, tending to cause a negative-going audio pulse to appear at output terminal 43. However, the same positive-going amplitude modulation cycle in the diode circuit 25—27 causes a negative-going audio pulse to appear across resistor 30 in series with capacitor 39. Since the triode grid 28 is coupled to this point by coupling capacitor 36, grid 28 receives a negative-going pulse. This pulse by amplification would tend to cause the plate current to decrease or tend to cause a positive-going audio pulse to appear at the output terminal 43. Consequently, by suitably choosing the value of resistance of resistor 30 to provide the right amount of cancelling voltage, the two tendencies may be made to cancel each other so that the fundamental frequency component of the undesired amplitude modulation component may be removed or reduced to a low level. This is seen from the wave form of voltage applied to grid 28 as shown in Fig. 2f and from the wave form of the triode detector plate current as shown in Fig. 2g.

While it will be understood that the circuit specifications and parameters for the frequency modulation detection shown can be made to perform within wide ranges, the following circuit parameters are included, by way of example only, as having been found suitable for satisfactory operation:

| | | |
|---|---|---|
| Tube 5 | | 6AU6 |
| Tube 26 | | 6AV6 |
| Resistor 38 | ohms | 150,000 |
| Variable resistor 30 | do | 0 to 3,000 |
| Resistor 35 | meg ohms | 10 |
| Resistor 37 | do | 1 |
| Potentiometer 41 | ohms | 500,000 |
| Capacitor 39 | mfd | 0.15 |
| Capacitor 31 | mmf | 120 |
| Capacitor 36 | mfd | 0.05 |
| Capacitor 46 | mmf | 430 |

The aforesaid circuit parameters perform well in the elimination of buzz in the audio output due to the effectiveness of the amplitude rejection circuits. It provides approximately 12 db of amplitude modulation rejection for all useable levels of 4.5 megacycle signals. The audio output level was found more than adequate to drive an output audio amplifier tube directly without the need of additional audio frequency amplification. A peak-to-peak audio voltage of over 50 volts was attained for a ±25 kilocycle frequency deviation with a B+ supply voltage of 250 volts.

Fig. 4 shows an alternative embodiment of this invention which differs from Fig. 1 in that the cathode 27 of tube 16 is not grounded. In this embodiment, resistor 38 is shunted by a capacitor 59. The cathode 27 of tube 26 is connected to ground through a variable resistor 60. Variable resistor 60 is shunted by a capacitor 61 and grid bias resistor 35 is shunted by a capacitor 66.

The operation of the circuit of Fig. 4 is similar to that of Fig. 1. The output of pentode amplifier 5 is amplitude compressed by the diode compressor circuit. A fraction of this R.F. voltage appears across variable resistor 60 as a result of the R.F. current flow through the interelectrode capacity between diode anode 25 and cathode 27. The R.F. voltage across capacitor 61 excites the grid tank circuit 32 by capacity coupling between the cathode 27 and the triode grid 28. The grid circuit is frequency sensitive so that the voltage applied to the grid rises and falls in accordance with the frequency swing applied to the tank circuit 32. The discriminator circuit operates as a slope detector as previously explained. The triode is biased near cut-off by the flow of grid current through bias resistor 35 so that the triode operates as a plate-bend or power detector to produce desired audio frequency plate current variations. Any residual amplitude modulation on the R.F. wave would in the absence of a detected wave across resistor 60 as the result of detection by diode 25, 27 produce undesired plate current variations, e.g. a positive modulation peak would produce an increase in plate current. However, the diode current flowing through variable resistor 60 also controls the triode plate current. A positive modulation peak produces a peak of positive amplitude modulation signal from cathode to ground. Such a polarity in the absence of the R.F. wave would cause the plate current of the triode to decrease. Therefore, if the resistance of variable resistor 60 is adjusted to an optimum value, the amplitude modulation by triode detection can be balanced out by the amplitude modulation component supplied by the diode compressor circuit, so that the resultant undesired amplitude modulation components appearing in the plate circuit of the triode are minimized or eliminated. Capacitor 61 performs the function of insuring that the R.F. grid excitation is not so great as to make proper A.M. balancing an impossibility. This capacitor may be eliminated provided that the impedance of the tank circuit 32 is properly chosen and the capacitance from cathode to ground of tube 26 and other wiring and stray capacitances are sufficient. Capacitor 66 performs the function of stabilizing the bias on grid 28 in order to insure that the tube is biased near cut-off so that it may act as a bias or power detector.

It should be pointed out that grounding the cathode of tube 26 as is done in Fig. 1 enables the use of the remaining diode anode for other purposes within the receiver, such as, for example in the automatic gain control circuit for the R.F. amplifier in the head end of the receiver for the purpose of delaying the application of A.G.C. to the head-end tube or tubes.

Fig. 5 shows another embodiment of this invention in which transistors and a semiconductor diode are employed in place of the vacuum tubes shown in Figs. 1 and 4. This embodiment employs an N-P-N type transistor 100 having a base electrode 101, an emitter electrode 102 and a collector electrode 103 to perform the function of the pentode amplifier 5 in previous embodiments. It also employs a solid-state diode 115 and a P-N-P type transistor 130 having a base electrode 131 and an emitter electrode 132 and a collector electrode 133 which devices perform the same functions as tube 26 in previous embodiments. The F.M. signal is applied at input terminals 91 and 92 through a coupling condenser 93 to the base electrode 101 of N-P-N type transistor 100. Emitter electrode 102 is connected to ground by a network consisting of a resistor 108 shunted by a by-pass capacitor 107. The direct current supply voltage is provided by a battery 126 having its negative terminal grounded. A bias voltage is supplied to the base 101 of transistor 100 by a resistance voltage divider consisting of a resistor 105 connected between the positive terminal of battery 126 and the base 101, and a resistor 106 connected between the base 101 and ground. Collector electrode 103 is connected through the primary winding 111 of a transformer 110 to the positive terminal of battery 126. The secondary winding 112 of transformer 110 has one terminal connected to ground and another terminal connected to an electrode of diode 115. Transformer 110 is tuned by a magnetic core 113 with the circuit capacitance to the center frequency of the F.M. signal. The other electrode of diode 115 is connected to ground through a diode load resistor 116. Since the impedance of transistor 100 is of a lower magnitude than that of pentode 5, the magnitude of resistor 116 is proportionately smaller than that of resistor 38. A series circuit consisting of a large capacitor 117 and a resistor 118 is shunted across resistor 116, one terminal of resistor 118 being connected to ground. A radio frequency capacitor 119 is shunted across resistor 118. Capacitor 119 performs the same function as capacitor 31 of Fig. 1, and its value is therefore adjusted so as to provide the proper excitation for the discriminator-detector network. The discriminator network consists of a shunt tuned circuit 120 consisting of a capacitor 122 and an inductor 121 in series with the input capacitance of transistor 130. Collector electrode 133 of P-N-P type transistor 130 is connected to ground. This configuration provides high input resistance at the base region of transistor 130 so that the discriminator circuit is not heavily damped, and can therefore perform its function of frequency discrimination effectively. The tuned circuit 120 is connected between the junction of capacitors 117 and 119 on one end thereof and is coupled to the base 131 through a blocking capacitor 123 on the other end thereof. Bias is provided for the base electrode 131 by a resistor 124 which is connected between the base electrode 131 and ground. Resistor 124 has a sufficiently high resistance so as to bias transistor 130 quite highly to reduce the emitter current to a low value so that the transistor may operate as a power detector. Emitter electrode 132 is connected through resistor 125 to the positive terminal of battery 126. Emitter 132 is bypassed to ground for radio frequencies by a capacitor 135. Emitter electrode 132 is also coupled by a blocking capacitor 136 to an output terminal 140 where the audio frequencies are available. Another output terminal 141 is connected to ground. It should be noted that by employing complementary transistors 100 and 130 that a single power supply may be used to supply operating potentials for the entire system.

The circuit of Fig. 5 performs exactly as has been previously described for the vacuum tube embodiments of Figs. 1 and 4. Diode 115 serves to compress undesired amplitude modulation components and as a byproduct thereof some undesirable A.M. audio of proper polarity is available across resistor 118 so as to cause the emitter current of transistor 130 to decrease as the A.M. audio reaches positive peaks. On the other hand, the R.F. reaching the base 131 of transistor 130 through the discriminator also having positive peaks of A.M. tend to increase the emitter current flow in transistor 130. When a proper choice of resistance 118 and capacitor 119 is made, the two effects may be made to cancel so as to provide for A.M. rejection. At the same time the discriminator circuit and transistor 130 detects the F.M. audio to provide a useful output signal at output terminals 140 and 141.

In accordance with the teachings of this invention, a separate two electrode detector may be employed in place of the triode or transistor which have been used as power detectors in the embodiments shown in Figs. 1, 4 and 5. These embodiments allow greater output voltages to be obtained, since a triode acting as a power detector provides only about one-third the output voltage as the same triode would provide when operating as a Class A audio amplifier.

In Fig. 6, the pentode amplifier limiter stage 5 and the diode compressor circuit are the same as those shown in previous embodiments. A neon glow lamp 160 is used as a two electrode F.M. detector. One terminal of secondary winding 24 of transformer 23 is coupled by a coupling capacitor 156 to one terminal of neon lamp 160. Alternatively, coupling capacitor 156 may be connected to the upper end of primary winding 22. A biasing potential is supplied to the other terminal of neon lamp 160 from B+ through a smoothing resistor 157 and through discriminator tank circuit 32. A smoothing capacitor 158 is connected across resistor 157 to ground to remove power supply ripple in the bias supply for neon lamp 160. An R.F. bypass capacitor 153 is shunted across variable resistor 30 since it is not necessary for R.F. to exist across it in this embodiment. The junction of capacitor 39 and variable resistor 30 is connected through a resistor 154 to a volume control 163 having a variable tap 164 thereon. The junction point between capacitor 156 and neon lamp 160 is also coupled to the volume control 163 through a resistor 155. Volume control 163 is bypassed by a capacitor 162 to ground to provide for proper deemphasis. Variable tap 164 of volume control 163 feeds the triode grid 28 through a blocking capacitor 165. A grid-leak resistor 166 is connected between the grid 28 and ground. A supply voltage for the plate 29 of tube 26 is provided through a resistor 159 which is connected between B+ and the plate 29. The output of the plate 29 of tube 26 is coupled by a capacitor 167 to output terminal 169.

In the operation of Fig. 6, the diode 25, 27 in tube 26 functions in cooperation with the pentode amplifier stage 5 to compress any undesired amplitude modulations appearing in the frequency modulated input signal. As was also previously explained, the diode also functions to produce detected undesired amplitude variations which appear in this instance as negative going A.M. pulses across variable resistor 30. However, in this embodiment the compressed undesired amplitude modulated F.M. wave is also applied via coupling capacitor 156 to the neon lamp detector 160 and to the discriminator consisting of the tank circuit 32 and the neon lamp capacitance. The frequency variations in the carrier wave are converted to amplitude variations by the discriminator. Since neon lamp 160 acts as a non-linear resistance, the conduction of the neon bulb varies in accordance with these amplitude variations about the bias level of the neon lamp. Neon lamp 160 also detects any of the compressed undesirable amplitude modulation components, and these pulses appear as positive pulses at the junction of neon lamp 160 and resistor 155. The desired amplitude variations are applied via resistor 155 and potentiometer 163 to the grid 28 of tube 26, and may be obtained in the plate circuit of tube 26 and output terminal 169. With the proper selection of capacitor 156, resistor 155, resistor 154, and variable resistor 30 A.M. cancellation may be achieved in the same manner as in previous embodiments.

With respect to the embodiment of Fig. 6, the position the tank circuit 32 and neon lamp 160 may be interchanged without affecting its operation inasmuch as there is no external connection to the junction point between tank circuit 32 and neon lamp 160.

Fig. 7 shows an alternative embodiment of Fig. 6 in which a diode detector 170 is employed in place of the neon lamp 160. In this embodiment the upper end of secondary winding 24 is coupled by coupling capacitor 156 to one terminal of tank circuit 32. Alternatively, capacitor 156 may be connected to the upper terminal of primary winding 22. The other terminal of tank circuit 32 is coupled to one electrode of diode 170. The other electrode of diode 170 is connected to ground. As will appear obvious to those skilled in the art, a semiconductor diode could be used in place of diode 170. Also, the position of diode 170 and tank circuit 32 may be interchanged. All that is necessary is that the diode polarity should be such that the electrode not grounded produces a positive D.C. voltage with respect to ground.

The operation of Fig. 7 is essentially the same as that of Fig. 6. Compressed R.F. waves are applied to the discriminator consisting of the capacitance of diode 170 and the tank circuit 32 via coupling capacitor 156 which converts frequency variations in the wave into corresponding amplitude variations. These amplitude variations are detected by diode 170. Any undesirable amplitude modulation components which appear on the R.F. wave are also detected and appear as positive-going A.M. pulses across resistor 155. The same undesirable A.M. components have also been detected by diode 25, 27 of the tube 26 and appear as negative-going A.M. pulses across resistor 154. By suitably selecting the proper values for capacitor 156, resistor 155, resistor 154, and variable resistor 30, these undesirable A.M. components may be cancelled.

In the disclosed embodiments the amplitude compressor circuit has been utilized to perform the dual functions of compressing and detecting the undesired amplitude modulation components. Whereas these embodiments are preferred, it will be apparent to those skilled in the art that a separate amplitude modulation detection circuit could be used if desired.

Since other modifications and changes varied to fit particular operating requirements and environments will be apparent to those skilled in the art, the invention is not considered limited to the examples chosen for purposes of disclosure, and covers all modifications and variations which do not constitute departures from the true spirit and scope of this invention.

What I claim as new and desire to secure by Letters Patent of the United States is:

1. A detector for deriving an output signal having an amplitude that varies in accordance with angular variations of a carrier wave which may also contain undesired amplitude modulation components comprising, in combination, means for compressing any undesired amplitude modulation components on said carrier wave, said last named means also detecting any of said undesired amplitude modulation components, discriminating means for converting said carrier wave into a second carrier wave having amplitude variations corresponding to the angular variations of said first mentioned carrier wave and including any undesired amplitude modulation of the first carrier wave, means for detecting any amplitude variations in the output of said discriminating means, and means for combining said detected undesired amplitude modulation components with the output of said last named detecting means to substantially reduce said undesirable amplitude modulation components.

2. A frequency modulation detection system for deriving an output an output signal from a frequency modulated carrier wave which may include undesirable amplitude modulation components comprising, in combination, first means for compressing the percentage of modulation of any of the undesirable amplitude modulation components on said carrier wave, said last named means also including a first detector means for detecting the compressed undesirable amplitude modulation components on said carrier wave, discriminator means for converting the frequency modulation components of said carrier wave into desired amplitude variations, second detection means for detecting the output of said discriminator means, and means for coupling the output of said first detection means to the input of said second detection means to provide said output signal in which the undesired amplitude modulation components are substantially reduced.

3. A frequency modulation detection system for deriving an audio frequency output signal from a frequency modulated carrier wave having undesirable amplitude modulation components comprising, in combination, an amplifier having input and output terminals said input terminals adapted to receive said frequency modulated carrier wave, means coupled to the output terminals of said amplifier for varying the load impedance of said amplifier inversely with respect to the percentage of amplitude modulation of said carrier wave due to the presence of undesirable amplitude modulation components thereby compressing the undesired amplitude modulation components on said carrier wave, said last named means including detection means for deriving the compressed undesired amplitude modulation components on said carrier wave, a frequency modulation detection means for converting the frequency modulation on said carrier wave to amplitude variations and deriving a wave of said amplitude variations, and means for coupling the output of said detection means to said frequency modulation detection means to provide said audio frequency output signal that is substantially free of said undesirable amplitude modulation components.

4. A frequency modulation detection system for deriving an output signal from a frequency modulated carrier wave which may also contain undesired amplitude modulation components comprising, in combination, an amplifier having input and output terminals with said input terminals being adapted to receive said carrier wave, amplitude compresser means coupled to the output terminals of said amplifier for reducing the percentage of amplitude modulation on said carried wave due to the presence of said undesired amplitude modulation components, said amplitude compressor means having a unilateral conducting device which detects any compressed amplitude modulation components on the compressed carrier wave and a resistor capacitor network having a time constant of such value that a portion of the compressed carrier wave and a portion of the detected compressed amplitude modulation components appear across the resistor capacitor network, a single ended discriminator coupled to said resistor capacitor network for converting said compressed carrier wave to an amplitude modulated carrier wave, a detector-amplifier means coupled to said discriminator for detecting the amplitude modulated carrier wave and combining therewith said detected compressed amplitude modulation components to substantially reduce the undesired amplitude modulation components appearing at the output of said detector-amplifier means.

5. A frequency modulation detection system comprising an amplifier having input and output terminals, a transformer having a primary and a secondary winding, means for connecting said primary winding to the output terminals of said amplifier, a unilateral conduction device, means for connecting one terminal of said secondary winding to one electrode of said unilateral conduction device and the other electrode of said unilateral conduction device to a point of ground potential, a first resistor, means for connecting said first resistor between the other terminal of said secondary winding and said point of ground potential, a first capacitor and a variable resistor serially connected across said first resistor, a second capacitor connected in shunt with said variable resistor, a third capacitor, having one terminal thereof connected to the junction of said first and second capacitors, a tuned circuit, means for connecting the other terminal of said third capacitor to one end of said tuned circuit, a second resistor, means for connecting said second resistor between said one end of said tuned circuit and said point of ground potential, an electron discharge device having a cathode, a control grid and a plate, means for connecting the other end of said tuned circuit to said control grid, means for connecting said cathode to said point of ground potential, and a load circuit connected to said plate electrode.

6. A frequency modulation detection system comprising an amplifier having input and output terminals, a transformer having a primary and a secondary winding, means for coupling said primary winding to the output terminals of said amplifier, a unilateral conducting device, means for connecting one terminal of said secondary winding to one electrode of said unilateral conducting device, a first resistor and a first capacitor connected in shunt between the other terminal of said secondary winding and a point of reference potential, a second resistor and a second capacitor connected in shunt between the other electrode of said unilateral detecting device and said point of reference potential, an electron discharge device having a plate, grid and cathode electrodes, said cathode electrode and said other electrode of said unilateral conducting device being common electrodes, a tuned circuit, a third resistor having one terminal thereof connected to said point of ground potential, means for connecting the tuned circuit between said grid electrode and the other terminal of said third resistor, and a load circuit connected to said plate electrode.

7. A frequency modulation detection system comprising, in combination, a transistor amplifier having an input and an output, a transformer having a primary and a secondary winding, means for coupling the output of said transistor amplifier to said primary winding, a semi-conductor diode and a first resistor serially connected across said secondary winding with the junction of said resistor and one terminal of said secondary winding being connected to ground, a first capacitor and second resistor serially connected between the junction of said semi-conductor diode and said first resistor and ground, a second capacitor shunted across said second resistor, a tuned circuit, means for connecting one terminal of said tuned circuit to the junction of said first and second capacitors, a transistor having a base, collector and emitter electrodes, means for coupling the other terminal of said tuned circuit to said base electrodes, means for connecting said collector electrode to ground, an output terminal, means for coupling said emitter electrode to said output terminal, a common source of operating potential, and means for applying said operating potential to said transistor amplifier and said transistor.

8. A frequency modulation detection system comprising, an amplifier having input and output terminals, a transformer having a primary and a secondary winding, means for coupling said primary winding to the output terminals of said amplifier, a unilateral conduction device, means for connecting one terminal of said secondary winding to one electrode of said unilateral conduction device and the other electrode of said unilateral conduction device to a point of ground potential, a first resistor, means for connecting said first resistor between the other terminal of said secondary winding and said point of ground potential, a first capacitor and a second resistor serially connected across said first resistor, a second capacitor connected in shunt with said second resistor, a circuit comprising a serially connected discriminator network and a detector coupled to the other terminal of said secondary winding, a voltage divider network means for coupling said circuit to one end of said voltage divider, means for coupling the junction of said first and second capacitors to the other end of said voltage divider network, an electron discharge device having a plate, grid and cathode electrode with said cathode electrode being common with one electrode of said unilateral conducting device, means for connecting a point in said voltage divider network to said grid electrode, and an output terminal coupled to said plate electrode.

9. The frequency modulation detection system defined in claim 8 wherein said detector comprises a neon lamp.

10. The frequency modulation detection system defined in claim 8 wherein said detector comprises a unilateral conducting device.

11. A frequency modulation detection system for deriving an output signal from a frequency modulated carrier wave which may also include undesirable amplitude modulation components, means for compressing the percentage of amplitude modulation of said undesirable amplitude modulation components on said carrier wave, said last named means including a rectifying means for deriving a first wave of the compressed undesirable amplitude modulation components, a discriminator means for converting said frequency variations on said carrier wave into corresponding desired amplitude variations, detection means coupled to said discriminator means for detecting a second wave comprising said desired amplitude variations and any residual undesired amplitude variations appearing on said carrier wave, and means for combining said first and second waves to obtain said output signal in which said undesirable amplitude modulation components are substantially reduced.

12. A frequency modulation detection system for deriving an output signal from a frequency modulated carrier wave which may contain undesirable amplitude modulation components, an amplifier stage having an input adapted to receive said frequency modulated carrier wave and an output, an electron discharge device having a first anode, a cathode, a control grid, and a second anode, first means coupled to the output of said amplifier for varying the output load impedance of said amplifier inversely with respect to the percentage of amplitude modulation of said frequency modulated carrier wave due to the presence of said undesirable amplitude modulation components, said first means including the first anode and cathode of said electron discharge device, second means connected to said first means for developing an audio frequency signal corresponding to the undesirable amplitude modulation components on said carrier wave and for developing a radio frequency signal corresponding to the output of said amplifier, a single ended discriminator, means for coupling said second means to one terminal of said discriminator, means for connecting the other terminal of said discriminator to the control grid of said electron discharge device, and an output circuit connected to the second anode of said electron discharge device.

13. A frequency modulation detection system for deriving an audio output signal from a frequency modulated carrier wave which may also contain undesired amplitude modulation components comprising, in combination, an amplifier having input terminals adapted to receive said carrier wave and output terminals, a tunable transformer which is tuned to the center frequency of said carrier wave having a primary and a second winding, said primary winding being coupled to the output terminals of said amplifier, an amplitude compressor circuit having a unilateral conducting device, a first RC network and a second RC network coupled to said secondary winding for compressing the percentage of amplitude modulation on said carrier and detecting said amplitude modulation components, the time constant of said first RC network being of such value as to maintain a bias on said unilateral conducting device over the audio frequency range, the time contant of said second RC network being of such value that a portion of the compressed carrier wave and a portion of the detected amplitude modulation components exist across it, a discriminator tuned to one side of the center frequency of said carrier wave for converting said carrier wave into an amplitude modulated wave, means for coupling said compressed carrier wave and said detected amplitude components to said discriminator, a detector coupled to said discriminator for detecting said amplitude modulated wave and for combining the detected amplitude modulated wave with said detected amplitude modulation components to produce said audio output signal which is substantially free of said undesired amplitude modulation components.

14. A frequency modulation detection system for deriving an audio output signal from a frequency modulated carrier wave containing undesirable amplitude modulation components, a pentode limiter amplifier stage having an input adapted to receive said carrier wave and an output, first means coupled to the output of said pentode limiter amplifier stage for varying the output load impedance of said pentode limiter amplifier stage inversely with respect to the percentage of amplitude modulation on said carrier wave due to the presence of said undesirable amplitude modulation components, means coupled to said last named means for developing a first audio frequency signal of said undesirable amplitude modulation components, means coupled to the output of said pentode limiter amplifier stage for converting the frequency variations of said carrier wave into amplitude variations, and means coupled to said last named means for detecting said amplitude variations to provide a second audio frequency signal which varies in accordance with all of the amplitude variations appearing in said last named means, and means for combining said first and second audio frequency signals of proper magnitude to provide said audio frequency output signal in which the undesirable amplitude modulation components have been substantially reduced.

15. A system for producing a signal that varies in amplitude in accordance with the angular variations of an input wave comprising in combination a source of waves having desired angular variations in accordance with a given intelligence and undesired amplitude modulation components, amplitude compression means coupled to said source to provide a first output wave similar to the waves provided by said source except having reduced percentage amplitude modulation and to provide a second output wave corresponding to the envelope of said undesired amplitude modulation components, a single ended discriminator detector means coupled to receive said first output wave for producing an intelligence signal that varies in amplitude as said first output wave varies in angle and means for coupling the second output wave of said compression means to said discriminator-detector means so as to cancel the fundamental component of the undesired amplitude modulation components that would otherwise appear in the intelligence signal.

16. A system for producing a signal that varies in amplitude in accordance with the angular variations of an input wave comprising, in combination, a source of waves having desired angular variations in accordance with a given intelligence and undesired amplitude modulation components, amplitude compression means coupled to said source to provide a first output wave similar to the waves provided by said source except having reduced percentage amplitude modulation, and means to provide a second output wave proportional to the envelope of said undesired amplitude modulation components, a single ended discriminator detector means coupled to receive said first output wave for producing an intelligence signal that varies in amplitude as said first output wave varies in angle and means for coupling the second output wave to said discriminator-detector means so as to cancel the fundamental component of the undesired amplitude modulation components that would otherwise appear in the intelligence signal.

References Cited in the file of this patent

UNITED STATES PATENTS

| | | |
|---|---|---|
| 2,154,398 | Crosby | Apr. 11, 1939 |
| 2,251,382 | Sziklai | Aug. 5, 1941 |
| 2,253,338 | Lewis | Aug. 19, 1941 |
| 2,282,961 | Harris | May 12, 1942 |
| 2,379,688 | Crosby | July 3, 1945 |
| 2,836,716 | Dome | May 27, 1958 |

UNITED STATES PATENT OFFICE

CERTIFICATE OF CORRECTION

Patent No. 2,954,464 September 27, 1960

Robert B. Dome

It is hereby certified that error appears in the printed specification of the above numbered patent requiring correction and that the said Letters Patent should read as corrected below.

Column 11, line 22, strike out "an output", second occurrence line 70, for "carried" read -- carrier --; column 13, line 1, for "electrodes" read -- electrode --.

Signed and sealed this 11th day of April 1961.

(SEAL)
Attest:
ERNEST W. SWIDER

Attesting Officer

ARTHUR W. CROCKER
Acting Commissioner of Patents